United States Patent
Haser et al.

(10) Patent No.: US 11,209,034 B2
(45) Date of Patent: Dec. 28, 2021

(54) SPRING DEVICE AND CONNECTING DEVICE

(71) Applicants: Lamello AG, Bubendorf (CH); Franz Baur, Oberstaufen (DE); Franz Josef Haser, Oberstaufen (DE)

(72) Inventors: Franz Josef Haser, Oberstaufen (DE); Franz Baur, Oberstaufen (DE); Patrick Jeker, Brislach (CH); Philipp Seiler, Arboldswil (CH)

(73) Assignees: Franz Baur, Oberstaufen (DE); Franz Josef Haser, Oberstaufen (DE); Lamello AG, Bubendork (CH)

( * ) Notice: Subject to any disclaimer, the term of this patent is extended or adjusted under 35 U.S.C. 154(b) by 413 days.

(21) Appl. No.: 16/231,462

(22) Filed: Dec. 22, 2018

(65) Prior Publication Data

US 2019/0128300 A1    May 2, 2019

Related U.S. Application Data

(63) Continuation of application No. PCT/EP2017/067311, filed on Jul. 10, 2017.

(30) Foreign Application Priority Data

Aug. 11, 2016 (DE) ...................... 10 2016 215 037.5

(51) Int. Cl.
*F16B 12/26* (2006.01)

(52) U.S. Cl.
CPC ...... *F16B 12/26* (2013.01); *A47B 2230/0062* (2013.01)

(58) Field of Classification Search
CPC .......... F16B 12/26; F16B 12/20; F16B 12/32; F16B 12/38; F16B 5/0084; F16B 5/0088;
(Continued)

(56) References Cited

U.S. PATENT DOCUMENTS

| | | | |
|---|---|---|---|
| 2,598,776 A * | 6/1952 | Flora | ....................... F16B 5/125 24/295 |
| 4,752,150 A | 6/1988 | Salice | |

(Continued)

FOREIGN PATENT DOCUMENTS

| | | |
|---|---|---|
| AU | 657908 B2 | 1/1992 |
| DE | 203 15 778 U1 | 1/2004 |

(Continued)

*Primary Examiner* — Patrick D Hawn
(74) *Attorney, Agent, or Firm* — Aslan Law, P.C.

(57) ABSTRACT

In order to provide a spring device which is of simple construction and enables achieving high spring forces and long spring paths, it is proposed that the spring device comprises the following: a spring element which is able to be brought from an initial state into a deflected state by elastic deformation; an abutment element against which the spring element is able to abut for reaching a deflected state of the spring element, wherein at least one end of the spring element is moveable relative to the abutment element by elastic deformation of the spring element, wherein the spring element in the initial state thereof has an increasing distance from the abutment element in the direction of the end of the spring element which is moveable relative to the abutment element.

16 Claims, 14 Drawing Sheets

(58) Field of Classification Search
CPC ..... F16B 2001/0092; A47B 2230/0062; A47B 47/042; A16B 2001/0092; Y10T 403/60; Y10T 403/606
See application file for complete search history.

(56) References Cited

U.S. PATENT DOCUMENTS

| | | | |
|---|---|---|---|
| 5,333,822 | A | 8/1994 | Benoit et al. |
| 5,529,428 | A * | 6/1996 | Bischof .................. F16B 12/14 403/408.1 |
| 6,186,698 | B1 | 2/2001 | Knapp |
| 6,969,832 | B1 * | 11/2005 | Daughtry, Sr. ......... F24D 3/141 219/531 |
| 7,226,233 | B2 | 6/2007 | SuBenbach et al. |
| 8,092,114 | B2 | 1/2012 | Baur et al. |
| 8,282,047 | B2 * | 10/2012 | Franks .................... H02G 3/26 248/71 |
| 9,624,959 | B2 | 4/2017 | Baur et al. |
| 9,714,673 | B2 * | 7/2017 | Phillips .................. F16B 12/24 |
| 10,113,575 | B2 | 10/2018 | Baur et al. |
| 10,371,191 | B2 * | 8/2019 | Baur ...................... F16B 12/26 |
| 10,473,133 | B2 * | 11/2019 | Baur ...................... E05B 63/123 |
| 10,480,558 | B2 | 11/2019 | Jeker et al. |
| 11,000,137 | B2 * | 5/2021 | Barnes .................... A47G 1/06 |
| 2003/0103801 | A1 * | 6/2003 | Smith .................... F16B 5/0614 403/194 |
| 2004/0060255 | A1 * | 4/2004 | Knauseder ............ F16B 5/0024 52/582.2 |
| 2005/0076484 | A1 | 4/2005 | Sussenbach et al. |
| 2007/0062127 | A1 * | 3/2007 | Nicoletti ............... E04B 2/7809 52/36.4 |
| 2010/0111598 | A1 * | 5/2010 | Baur ..................... E05B 63/123 403/348 |
| 2013/0287484 | A1 * | 10/2013 | Phillips ............... A47B 47/0025 403/298 |
| 2015/0345532 | A1 * | 12/2015 | Baur ....................... F16B 21/08 403/326 |
| 2016/0333911 | A1 | 11/2016 | Baur et al. |
| 2016/0333912 | A1 * | 11/2016 | Baur ...................... F16B 12/20 |
| 2016/0333913 | A1 * | 11/2016 | Baur ..................... E05B 63/123 |
| 2017/0114812 | A1 * | 4/2017 | Jeker ...................... F16B 12/20 |
| 2017/0175791 | A1 * | 6/2017 | Baur ...................... F16B 12/26 |
| 2017/0254349 | A1 * | 9/2017 | Baur ....................... A47B 77/02 |
| 2019/0128300 | A1 * | 5/2019 | Haser ..................... F16B 12/26 |
| 2020/0032828 | A1 * | 1/2020 | Baur ........................ F16B 5/02 |

FOREIGN PATENT DOCUMENTS

| | | |
|---|---|---|
| DE | 10 2013 203 289 A9 | 12/2014 |
| DE | 20 2015 100 252 U1 | 6/2015 |
| DE | 10 2014 109 547 A1 | 1/2016 |
| DE | 20 2014 010 633 U1 | 3/2016 |
| EP | 1 990 549 A1 | 11/2008 |
| JP | S54-164704 U | 11/1979 |
| JP | 3179479 B2 | 6/2001 |
| JP | 2003-072508 A | 3/2003 |
| JP | 2006-513224 A | 4/2006 |
| SU | 1269748 A3 | 11/1986 |
| WO | WO 92/00461 | 1/1992 |
| WO | WO 2004/058329 | 7/2004 |
| WO | WO 2012/095454 A1 | 7/2012 |

* cited by examiner

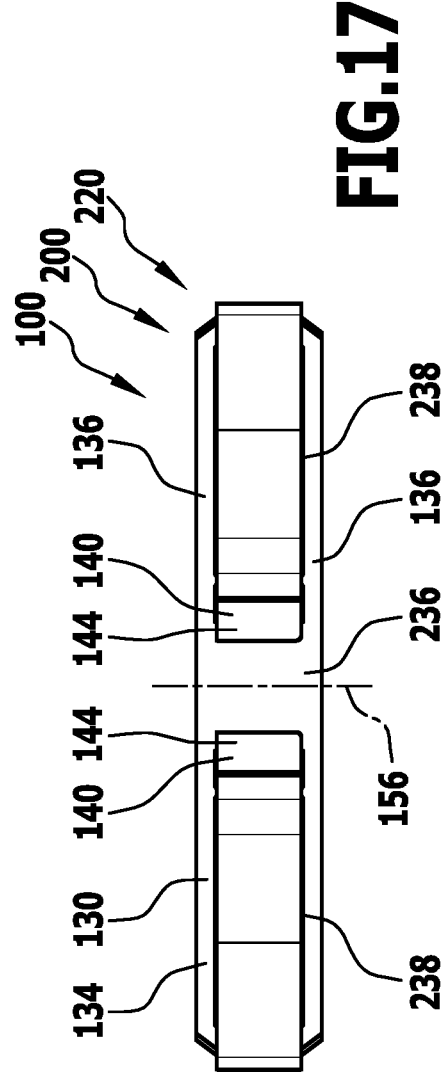
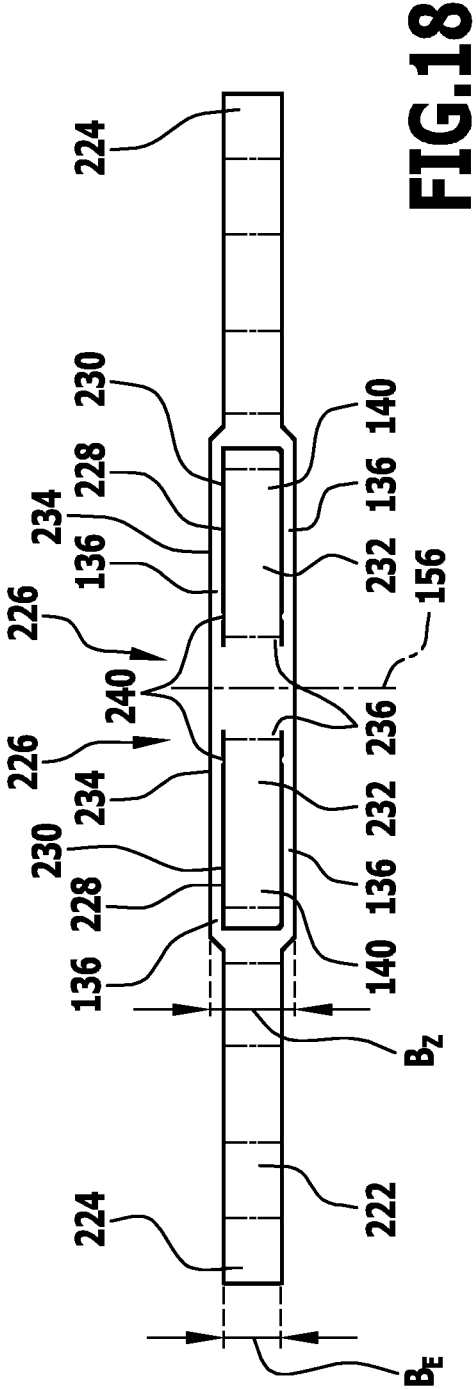

SPRING DEVICE AND CONNECTING DEVICE

RELATED APPLICATION

This application is a continuation of international application No. PCT/EP2017/067311 filed on Jul. 10, 2017, and claims the benefit of German application No. 10 2016 215 037.5 filed on Aug. 11, 2016, which are incorporated herein by reference in their entirety and for all purposes.

FIELD OF DISCLOSURE

The present invention relates to a spring device which in particular may be a component of a connecting device for connecting two objects.

BACKGROUND

Connecting devices for connecting objects, in particular for connecting furniture or machine components, are known, e.g., from EP 1 990 549 A1 or DE 10 2013 203 289 A9.

SUMMARY OF THE INVENTION

The object underlying the present invention is to provide a spring device which is of simple construction and enables achieving high spring forces and long spring paths.

This object is achieved in accordance with the invention by a spring device which comprises the following:

a spring element which is able to be brought from an initial state into a deflected state by elastic deformation;

an abutment element against which the spring element is able to abut for reaching a deflected state of the spring element, wherein at least one end of the spring element is moveable relative to the abutment element by elastic deformation of the spring element, wherein the spring element in the initial state thereof has an increasing distance from the abutment element in the direction of the end of the spring element which is moveable relative to the abutment element.

As a result of the combination, in accordance with the invention, of spring element and abutment element, an optimal elastic deformation of the spring element may preferably be achieved in order to ultimately enable particularly high spring forces and long spring paths.

The spring element is hereby in particular reversibly deformable.

A first end of the spring element is in particular arranged opposite the end of the spring element which is moveable relative to the abutment element.

It may be favorable if the spring element on the first end of the spring element is indirectly or directly connected to the abutment element. The first end is in particular an end of the spring element which is fixed relative to the abutment element.

The end of the spring element which is moveable relative to the abutment element is in particular a second end of the spring element.

The spring element in particular abuts or is able to abut against the abutment element for reaching a maximally deflected state.

In one embodiment of the invention, provision may be made for the spring element in the initial state thereof to have a distance from the abutment element which is constantly increasing and/or continuously increasing and/or over-proportionally increasing in the direction of the end of the spring element which is moveable relative to the abutment element.

Provision may be made for the abutment element to comprise an abutment surface for abutting the spring element, wherein the abutment surface is of curved configuration. In particular, provision may be made for the abutment surface to be curved in the shape of a circular segment.

The abutment element and/or the spring element preferably each have a constant curvature radius, wherein the two radii of curvature in particular are different from each other.

Further, provision may be made for the abutment element or the spring element in the initial state to be of non-curved and/or linear configuration.

The abutment surface preferably has a circular segment shape with stronger curvature than a surface of the spring element which is able to abut against the abutment surface.

However, provision may also be made for a surface of the spring element which is able to abut against the abutment surface to have a stronger curvature than the abutment surface.

The specifications stated above are in particular in relation to the initial state of the spring device.

In the deflected state of the spring element, in particular in a maximally deflected state of the spring element, the abutment surface and a surface of the spring element which is abutted against the abutment surface preferably have an at least approximately identical curvature. In particular, in this case, a substantially identical circular segment-shaped curvature may be provided.

A circular segment-shaped curvature is to be understood in particular in that a surface of the spring element which is able to abut against the abutment surface or, respectively, the abutment surface itself is curved in such a way that the normal vectors of the surface and the abutment surface, respectively, have a common point of intersection or a common line of intersection.

In one embodiment of the invention, provision may be made for the spring element and the abutment element to be formed as one piece with each other.

The spring element and the abutment element are in particular one single component and/or are produced or producible in one common production step or production method.

The spring device may be a plastic injection molded product, for example.

Alternatively thereto, provision may be made for the spring device to be a sheet metal shaped product.

In addition, provision may be made for the spring device to comprise a plastic injection molded product and/or a sheet metal shaped product.

For example, provision may be made for the spring element to be a sheet metal shaped product, while the abutment element is a plastic injection molded product.

The spring element may, e.g., be insertible or inserted or pluggable or plugged into a spring receptacle of the base body of a connecting element. The base body preferably comprises or forms at least one abutment element.

It may be favorable if the spring element is able to abut in area contact against the abutment element.

In particular, provision may be made for the spring element with increasing deflection from the initial state to abut directly against the abutment element in an enlarging contact surface, in particular abut uninterruptedly against the abutment element.

A length of a section of the spring element which is free and/or not supported on the abutment element preferably reduces with increasing deflection of the spring element. In particular, a free spring length of the spring element is thus preferably reduced with increasing deflection. The reduction of the length of the section of the spring element which is free and/or not supported on the abutment element leads in particular to an increase in the spring force.

The spring element is preferably unwound on the abutment element with increasing deflection.

A contact surface is in particular that surface at which the spring element and the abutment element contact each other.

The contact surface is preferably minimal, in particular equal to zero, in the initial state.

When the deflection of the spring element from the initial state begins, it preferably results in a contact surface in the region of the first end of the spring element.

With increasing deflection of the spring element, the contact surface preferably enlarges along the abutment surface in the direction of the end of the spring element which is moveable relative to the abutment element, in particular commencing from the first end of the spring element.

The contact surface is preferably configured to be at least approximately continuous and/or simply connected. As a result, in particular a reliable abutment of the spring element against the abutment element and at the same time an efficient tensioning of the spring element are possible. In particular, an undesired loading or overloading of the spring element at points or in the form of a line may preferably be avoided as a result.

It may be advantageous if a local elastic deformation of the spring element in the deflected state is at least approximately identical at all positions along a contact surface in which the spring element and the abutment element contact each other.

It may be further advantageous if a local curvature of the spring element in the deflected state is at least approximately identical at all positions along a contact surface in which the spring element and the abutment element contact each other.

In addition, it may be advantageous if a local bending moment of the spring element in the deflected state is at least approximately identical at all positions along a contact surface in which the spring element and the abutment element contact each other.

The spring element and the abutment element are preferably fixed relative to each other and/or configured in such a way that the distances described above and/or the deformation described above may be achieved.

"At least approximately identical" is to be understood in particular as deviations in the degree of deformation of at most about 30%, for example at most about 20%, in particular at most about 10%.

Upon an only partial relaxation of the spring element, whereby in particular an arresting state, locking state, and/or latching state of the spring device may be achieved, the spring element preferably still abuts against the abutment element in sections. The free spring length of the spring element is preferably of shorter configuration in the arresting state, locking state, and/or latching state of the spring device, in particular in comparison to a free spring length in a fully relaxed initial state.

Provision may be made for the spring device to comprise multiple spring elements and/or multiple abutment elements.

Further, provision may be made for the spring device to comprise only one single spring element and/or only one single abutment element.

The spring element and the abutment element preferably form a spring unit.

The spring device may preferably comprise multiple such spring units.

It may be favorable if the spring device comprises multiple spring units, wherein the spring elements of the spring units are preferably deformable, in particular deflectable, opposite each other.

Alternatively hereto, provision may be made for the spring elements of the spring units to have an identical direction of deflection.

Provision may be made for the spring device to comprise multiple spring elements which are able to abut against an abutment element one next to the other, or one behind the other in the direction of deflection, or one on top of the other.

Multiple spring elements arranged one behind the other are configured in particular as a spring pack.

It may be favorable if the end of the spring element which is moveable relative to the abutment element has a latching element and/or a hook element.

In particular, a bent and/or curved and/or beveled end section of the end of the spring element which is moveable relative to the abutment element may be provided.

The spring element preferably has at least approximately an L-shape.

In particular, an engagement section of the spring element may be formed by means of the latching element and/or the hook element. By means of such an engagement section, it may in particular be made possible to use the spring device as a component of a connecting device.

The spring device in accordance with the invention is thus suited in particular for use in a connecting device.

The present invention thus also relates to a connecting device for connecting two objects, in particular for connecting furniture or machine parts.

It may be favorable if the connecting device has at least one spring device, in particular a spring device in accordance with the invention.

An abutment element of the spring device may hereby be formed, e.g., by a connecting element of the connecting device or by one or both of the objects to be connected to each other.

It may be favorable if the connecting device comprises a connecting element which has a one-piece base body which comprises the at least one spring device.

The base body may in particular comprise a plastics material and/or a metallic material or be formed of a plastics material and/or a metallic material.

It may be favorable if the connecting device comprises one or more connecting elements which in a connecting state and/or anchoring state are arranged on at least one of the objects, wherein at least one connecting element comprises one or more non-self-cutting holding projections which each have a curved supporting face which is circular arc-shaped in a longitudinal section.

The one or more holding projections are preferably insertible into a groove, provided on one of the objects, with a curved undercut surface which is circular arc-shaped in a longitudinal section.

The groove preferably comprises a base section and one or more undercut sections extending away from the base section in a thickness direction.

The one or more holding projections preferably engage in the connecting state and/or anchoring state into the one or more undercut sections of the groove.

It may be favorable if the connecting device comprises one or more connecting elements for arranging on and/or in a first object and/or one or more connecting elements for arranging on and/or in a second object.

For connecting the objects to each other, preferably at least one connecting element on and/or in the first object is able to be brought into engagement with the second object, in particular with at least one connecting element on and/or in the second object.

For example, provision may be made for a first connecting element to be arranged on and/or in a first object. A second connecting element may preferably be arranged on and/or in a second object. However, provision may also be made for no connecting element to be provided on the second object. In this case, in particular a direct fixing of the first connecting element to the second object is then provided. A second connecting element is then preferably expendable.

The first connecting element preferably has the one or more spring devices or at least one or more spring elements of the one or more spring devices. The second connecting element of the second object then preferably has one or more engagement section or receiving element on which the one or more second ends of the one or more spring elements are able to engage.

A spring force of the one or more spring elements preferably brings about a holding force between the two objects, in particular between the first connecting element and the second connecting element or between the first connecting element and the second object.

A spring element is thus in particular a holding element.

The connecting device preferably further comprises at least one connecting element which comprises a holding element for producing a connection between the two objects and/or a storage device for storing a holding energy of the holding element.

The storage device comprises in particular an arresting element for arresting one or more spring elements in a deflected state.

In particular the spring force in the one or more spring elements may be stored by means of the arresting element of the storage device.

Before producing a connection between the two objects, holding energy is preferably suppliable to the storage device, in particular by biasing/deflecting the one or more spring elements.

The holding energy supplied is preferably storable by means of the storage device until producing the connection. In particular, the storage of the energy hereby occurs in the one or more spring elements.

It may be favorable if the storage device is actuateable upon producing the connection between the two objects and/or for producing the connection between the two objects.

The holding element is able to be brought into a holding position by this actuation, preferably by using the holding energy. In particular, provision may be made for the holding element to be configured as a spring element and be relaxed from a deflected state into an at least less far deflected state or into the initial state and hereby in particular a force-fitting and/or form-fitting connection between the two objects produced.

Further, provision may be made for holding energy to be suppliable to the storage device, in particular one or more spring elements, before, during, and/or after the installation of the connecting element in the object.

The connecting device in accordance with the invention is suited in particular for connecting two objects.

The present invention therefore also relates to a method for connecting two objects, in particular furniture or machine parts.

The method in accordance with the invention preferably comprises the following:

providing a connecting device, in particular a connecting device in accordance with the invention;

arranging a connecting element on one of the objects or introducing a connecting element into one of the objects;

connecting the connecting element to the further object, in particular to a further connecting element arranged on and/or in the further object.

In particular, a spring device of the connecting device is actuated for connecting the connecting element to the further object.

The present invention further relates to a method for producing a spring device and/or a connecting device which comprises a spring device.

In this regard, the object underlying the invention is to provide a method by means of which a spring device and/or a connecting device are producible in a simple manner, wherein outstanding spring properties are preferably also to be achieved.

This object is achieved in accordance with the invention by a method for producing a spring device, in particular a spring device in accordance with the invention, wherein the method preferably comprises the following:

providing a sheet metal strip which has a least one U-shaped material recess, in particular punching, such that a middle section surrounded by the U-shaped material recess, in particular punching, and a web section of the sheet metal strip surrounding the U-shaped material recess, in particular punching, are formed;

bending out the middle section for forming a spring element;

plastically shaping the web section in such a way that one or two holding projections projecting laterally away from the spring element are formed which in particular are circular segment-shaped in a longitudinal section;

and/or plastically shaping an end of the sheet metal strip in such a way that the end of the sheet metal strip is bent back to the sheet metal strip and in particular is fixed on a transition section, wherein the transition section connects the middle section to the web section.

A part of the shaped end of the sheet metal strip projecting away from the transition section is preferably of curved configuration.

An abutment element for abutting the spring element formed by the middle section is preferably formed by means of the end of the sheet metal strip.

The end of the sheet metal strip is in particular insertible into and/or fixable in the opening formed in the web section of the sheet metal strip by bending out the middle section.

It may be favorable if the web section, in particular the opening in the web section, comprises one or more latching elements and/or clamping elements for fixing the end of the sheet metal strip.

For example, the latching elements or clamping elements may be formed by projections projecting into the opening.

A free end of the spring element is preferably bent or beveled. In particular, an engagement section of the spring element is preferably thereby producible. The engagement section is in particular a latching element or hook element.

The sheet metal strip is preferably formed mirror-symmetrical in relation to a transverse center plane and comprises in particular two U-shaped material recesses, in particular punchings, and two ends, such that two spring element and two abutment elements may ultimately be formed.

The spring elements are in particular deflectable in opposing directions of deflection.

The sheet metal strip preferably has an at least approximately constant thickness of at least about 0.5 mm and/or at most about 1.5 mm. A thickness of the sheet metal strip is preferably at least approximately 0.8 mm.

A width of the sheet metal strip in the region of the U-shaped material recess and thus in the region of the middle section and the web section is preferably at least about 8 mm, for example about 10 mm.

The one or both ends of the sheet metal strip preferably have a width of at least about 5 mm and/or at most about 8 mm, for example about 6.8 mm.

The sheet metal strip is preferably wider in the region of the one or two U-shaped material recesses than in the region of the one or both ends.

A width of one or both spring elements which are formed by the one or both middle sections preferably corresponds at least approximately to the width of the sheet metal strip at the one or both ends.

As a result of the different width of the sheet metal strip, in particular one or more holding projections may be formed for anchoring the spring device and/or the connecting element of the connecting device in a corresponding groove.

Further preferred features and/or advantages of the present invention are the subject matter of the subsequent description and the illustrative depiction of embodiments.

BRIEF DESCRIPTION OF THE DRAWINGS

FIG. 17 shows a schematic top view from above of the connecting element from FIG. 15 with viewing direction in the direction of arrow 17 in FIG. 15; and FIG. 18 shows a schematic top view of a sheet metal strip for producing the connecting element of the connecting device from FIG. 14.

The same or functionally equivalent elements are provided with the same reference numerals in all Figures.

DETAILED DESCRIPTION OF THE DRAWINGS

Figure 1:
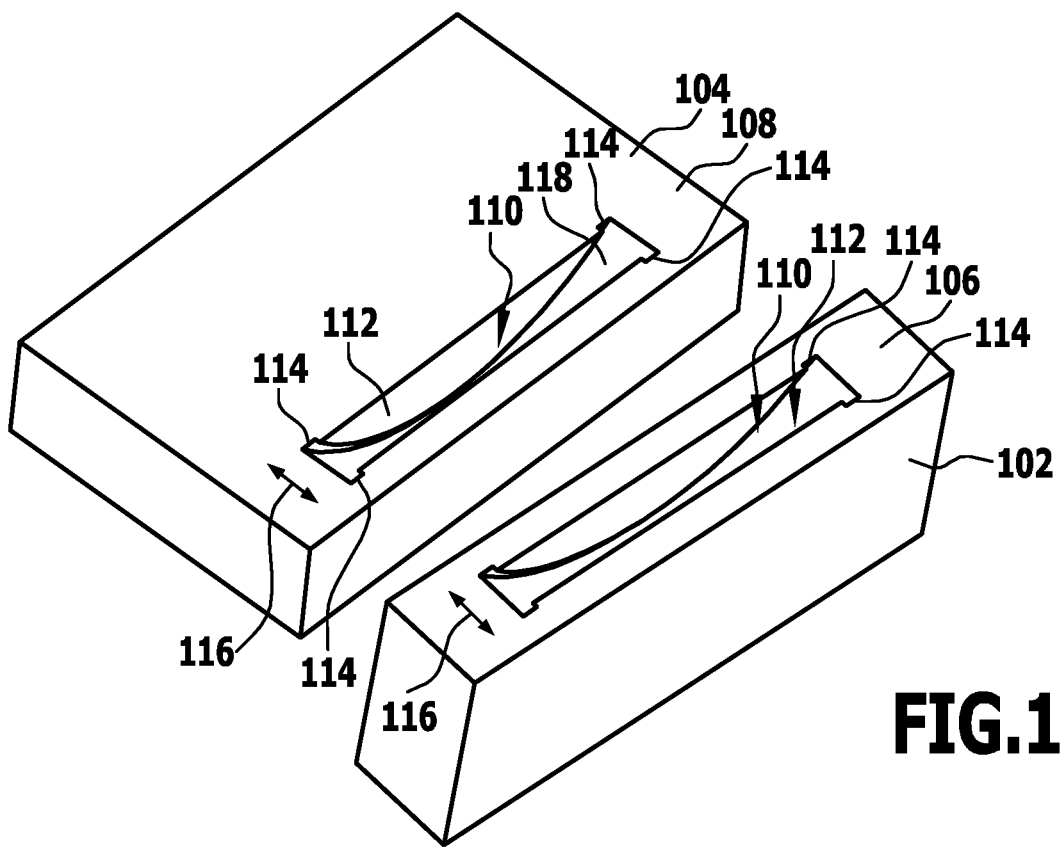
FIG. 1 shows a schematic perspective depiction of two components which are connectible to each other by means of a connecting device and comprise two grooves with undercut sections for this purpose.
Figure 2:
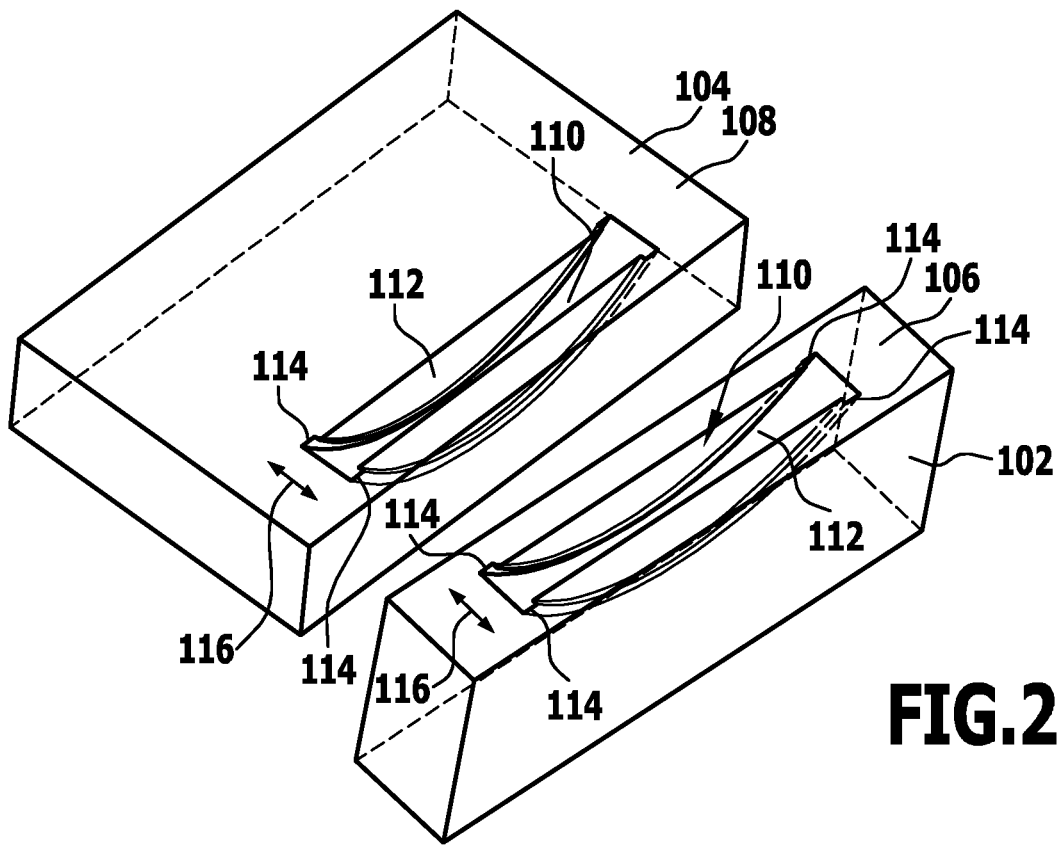
FIG. 2 shows a partially transparent depiction of the components from FIG. 1.
Figure 3:
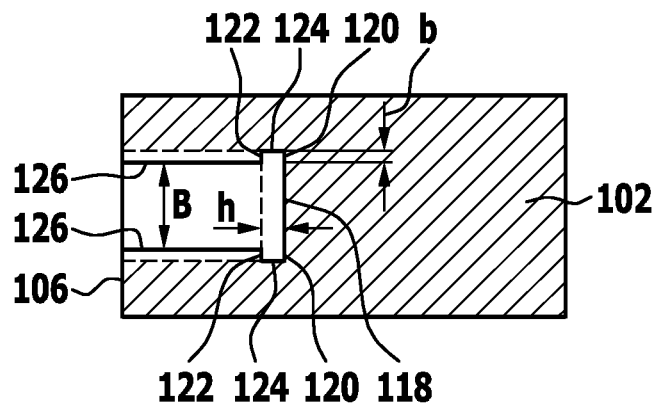
FIG. 3 shows a schematic cross section through one of the components from FIG. 1.
Figure 4:
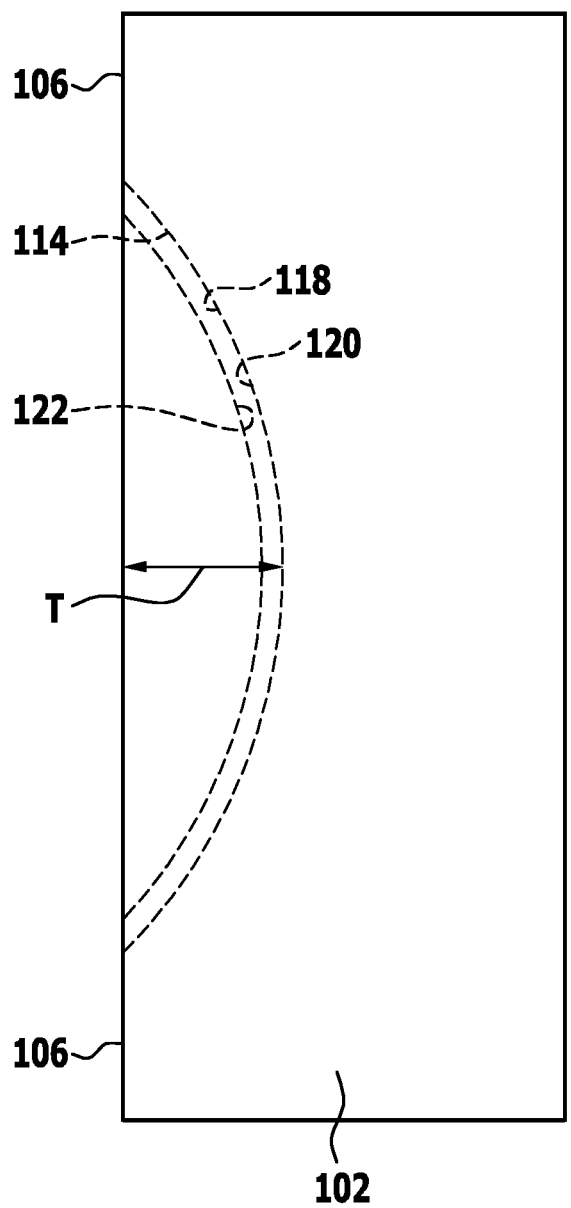
FIG. 4 shows a schematic partially transparent side view of the component from FIG. 3.

A connecting device designated as a whole with 100 serves, e.g., for connecting a first substantially plate-shaped component 102 to a second, likewise substantially plate-shaped component 104 (see FIGS. 1 to 4).

The two components 102 and 104 consist, e.g., of wood or plywood, but could also consist of any other materials, for example of a metallic material or a plastics material (for example plexiglass). Further, provision may be made for the first component 102 and the second component 104 to consist of mutually different materials.

In the connected state of the two components 102 and 104, a contact surface 106 of the first component 102 forming a narrow side of the first component 102 abuts against a contact surface 108 of the second component 104 forming a main face of the second component 104.

In each case one groove 110, which is formed in the respective component 102 and 104, respectively, and which comprises a circular cylinder segment- or circular cylinder section-shaped base section 112 and two undercut sections 114 extending away from the base section 112 in a thickness direction 116, open at each of the contact surfaces 106, 108.

The curvature radius of the base section 112 is larger than the groove depth T (see FIG. 4), such that the arched groove base surface 118 intersects the respective contact surface 106, 108 at an acute angle.

The base section 112 of the groove 110 has a width B of, e.g., about 8 mm in the thickness direction 116.

Each of the undercut sections 114 of the groove 110 is delimited on the side thereof which is remote from the respective contact surface 106 and 108, respectively, by a base surface 120 which is flush with the groove base surface 118 and is configured to be circular cylinder shell section-shaped and has the same curvature radius as the groove base surface 118 of the base section 112.

In the direction toward the contact surface 106 and 108, respectively, each undercut section 114 is delimited by a likewise circular cylinder shell section-shaped undercut surface 122 which is formed concentrically to the base surface 120 and has a smaller curvature radius.

Each of the undercut sections 114 are delimited laterally by a lateral delimiting surface 124 running perpendicular to the respective contact surface 106 and 108, respectively.

The width b, i.e. the extent in the thickness direction 116, is, e.g., about 1 mm for each of the undercut sections 114.

The height h, i.e. the distance between the base surface 120 and the undercut surface 122, is, e.g., about 2 mm for each of the undercut sections 114.

The base section 112 of each groove 110 is delimited by lateral delimiting walls 126 which run substantially perpendicular to the respective contact surface 106 and 108, respectively, and which have the distance from each other of the groove width B.

In order form the grooves 110 described above on the components 102 and 104, the groove milling device described in EP 1 990 549 A1 may be used, for example.

For connecting the components 102, 104 to each other, one or more grooves 110, in particular grooves 110 of the kind described above, may be provided in each of the components 102, 104.

However, provision may also be made for only one of the components 102, 104 to be provided with one or more grooves 110, in particular grooves 110 of the kind stated above, while the further component 104, 102 comprises no groove 110 of the kind described above, a groove 110 of a different configuration, one or more bores, one or more recesses, one or more projections, and/or one or more cutouts, or is unworked.

Different embodiments of connecting devices 100 for connecting various components 102, 104 are described in the following.

An embodiment, depicted in FIGS. 5 to 8, of a connecting device designated as a whole with 100, is known from DE 10 2013 203 289 A9.

For connecting the components 102, 104 to each other, the connecting device comprises a first connecting element 130 and a second connecting element 132.

Each of the connecting elements 130, 132 preferably comprises a base body 134 which is of substantially circular cylinder segment-shaped or circular cylinder section-shaped configuration.

The base body 134 is in particular, at least in sections and at least approximately, formed complementary to the base section 112 of the groove 110.

Each of the connecting elements 130, 132 further comprises two holding projections 136 which extend in the thickness direction 116 away from the section of the base body 134 formed complementary to the base section 112.

The holding projections 136 are arcuately curved and are formed at least approximately substantially complementary to the undercut sections 114 of the groove 110.

By means of the holding projections 136, the connecting elements 130, 132 may thus be fixed to the components 102, 104, in particular in the grooves 110 of the components 102, 104, in a form-fitting manner, at least in relation to a connecting direction 138.

For this purpose, the connecting elements 130, 132 are insertible into the grooves 110 of the components 102, 104 along the undercut sections 114.

Figure 8:
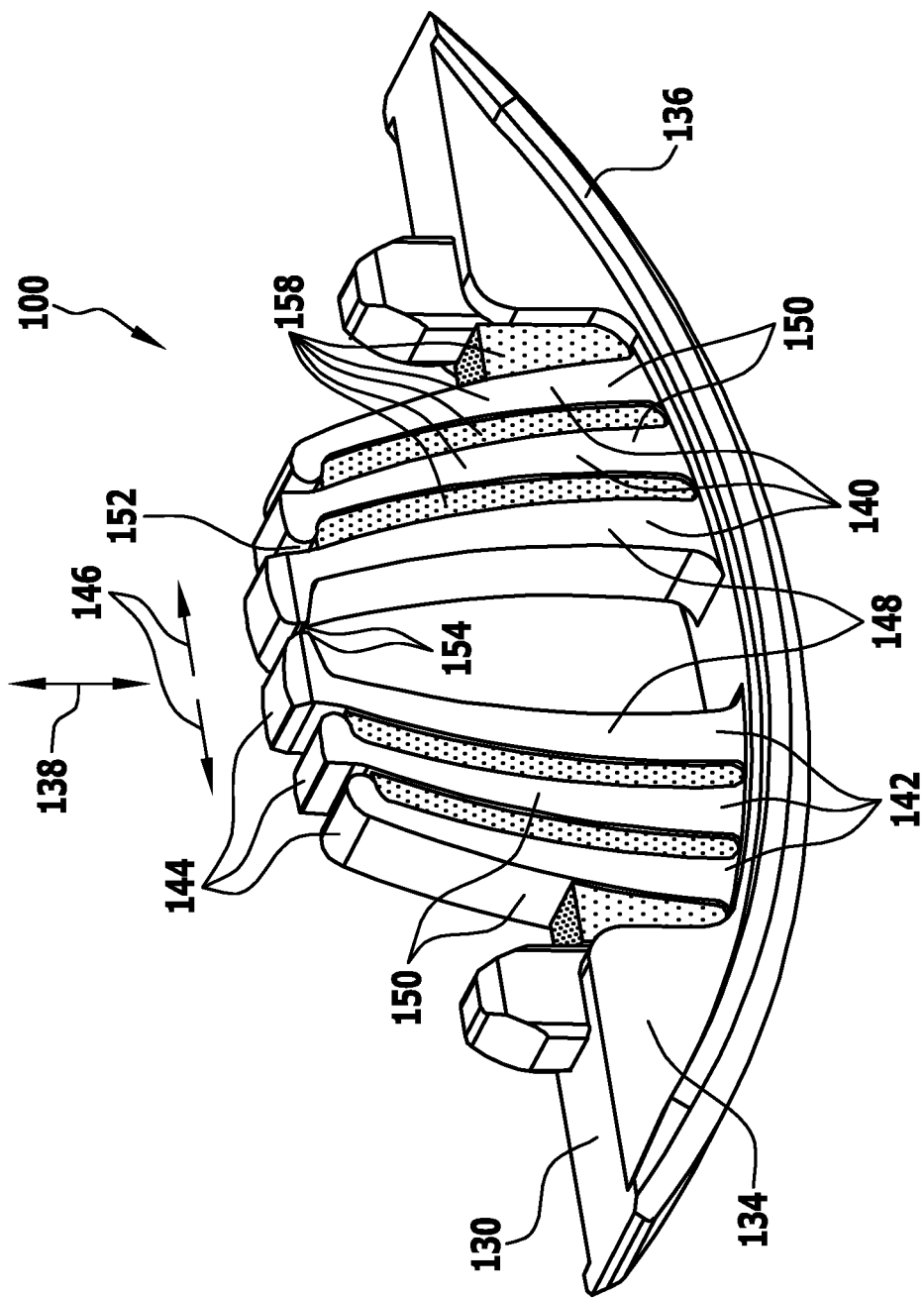
FIG. 8 shows a schematic perspective depiction of the first connecting element of the connecting device from FIG. 5.

As may be gathered in particular from FIG. 8, the first connecting element 130 comprises the base body 134, the holding projections 136, and one or more spring elements 140.

The spring elements 140 are leaf springs, for example.

Each spring element 140 has a first end 142 facing the base body 134 and a second end 144 remote from the base body 134.

With the end 142 of each one spring element 140 facing the base body 134, the spring element 140 is arranged on the base body 134, in particular connected as one piece to the base body 134.

The end 144 of each one spring element 140 remote from the base body 134 is moveable in a direction of deflection 146 aligned transverse, in particular substantially perpendicular, to the connecting direction 138.

For this purpose, the spring elements 140 are configured to be elastically bendable.

In the embodiment, depicted in FIGS. 5 to 8, of the first connecting element 130, two spring elements 140 are provided which come into direct contact with a receiving element (still to be described) of the second connecting element 132 for connecting the connecting elements 130, 132. These spring elements 140 are thus main spring elements 148.

The further spring elements 140 are auxiliary spring elements 150 which interact with the receiving element of the connecting element 132 only indirectly, namely by means of the main spring elements 148, for connecting the connecting elements 130, 132.

The auxiliary spring elements 150 are arranged adjacent to the main spring elements 148 and have abutment sections 152 at the end 144 of the auxiliary spring elements 150 remote from the base body 134, by means of which abutment sections 152 the auxiliary spring elements 150 are able to abut against the main spring elements 148 in order to be able to act on the main spring elements 148.

The main spring elements 148 at the end 144 of the main spring elements 148 remote from the base body 134 each comprise an engagement section 154 with which the main spring elements 148 are able to be brought into engagement with the receiving element of the second connecting element 132 for connecting the connecting elements 130, 132.

In particular, the engagement sections 154 of the main spring elements 148 are deflectable in the direction of deflection 146 in order to be brought into engagement with the receiving element of the second connecting element 132.

The auxiliary spring elements 150 are arranged on the sides of the main spring elements 148 remote from the engagement sections 154.

The engagement sections 154 of the main spring elements 148 may preferably be moved away from a transverse center plane 156 in opposing directions of deflection 146. It is hereby caused that the ends 144 of the auxiliary spring elements 150 remote from the base body 134 are likewise deflected in the corresponding directions of deflection 146.

The force required for deflection is significantly increased by the additional deflection of the auxiliary spring elements 150, as spring force acting counter to the deflection is at least approximately a sum of the spring force of the main spring element 148 and the associated auxiliary spring element 150.

The auxiliary spring elements 150 thus form reinforcing elements 158 for reinforcing a spring action of spring force of the main spring element 148.

The second connecting element 132 likewise comprises a base body 134 which is, at least in sections and at least approximately, formed complementary to the groove 110 of the components 102, 104.

The second connecting element 132 further comprises two holding projections 136 which are of arcuate configuration and are formed substantially complementary to the undercut sections 114 of the groove 110.

The second connecting element 132, too, may thus easily be inserted into a groove 110 and be fixed therein.

The second connecting element 132 preferably comprises a receiving element 168 by means of which the second connecting element 132 is able to be brought into engagement with the first connecting element 130, in particular with the spring elements 140 of the first connecting element 130.

Figure 5:
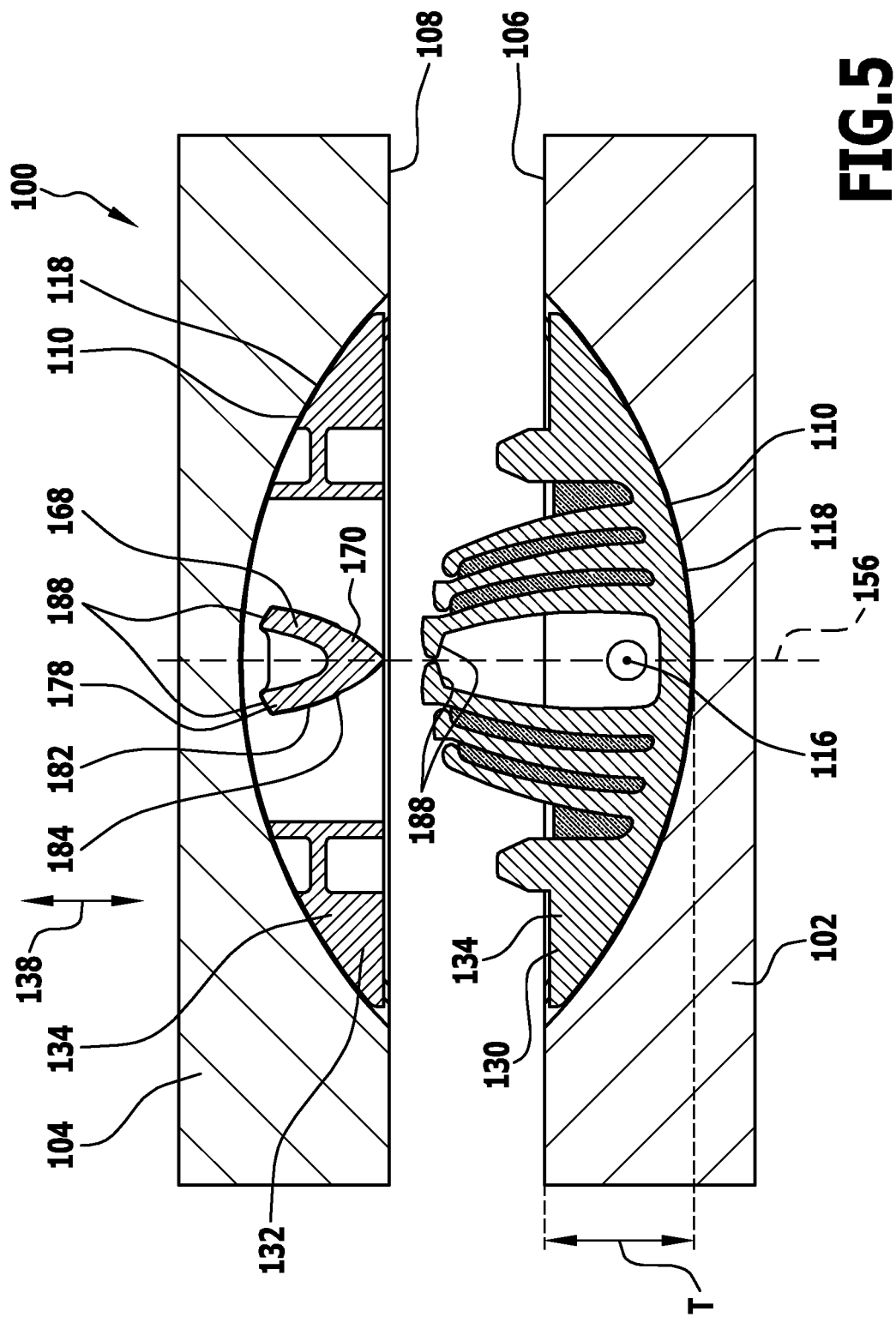
FIG. 5 shows a schematic longitudinal section through two components and two connecting elements of a known connecting device for connecting the two components, in a separated state of the components.
Figure 7:
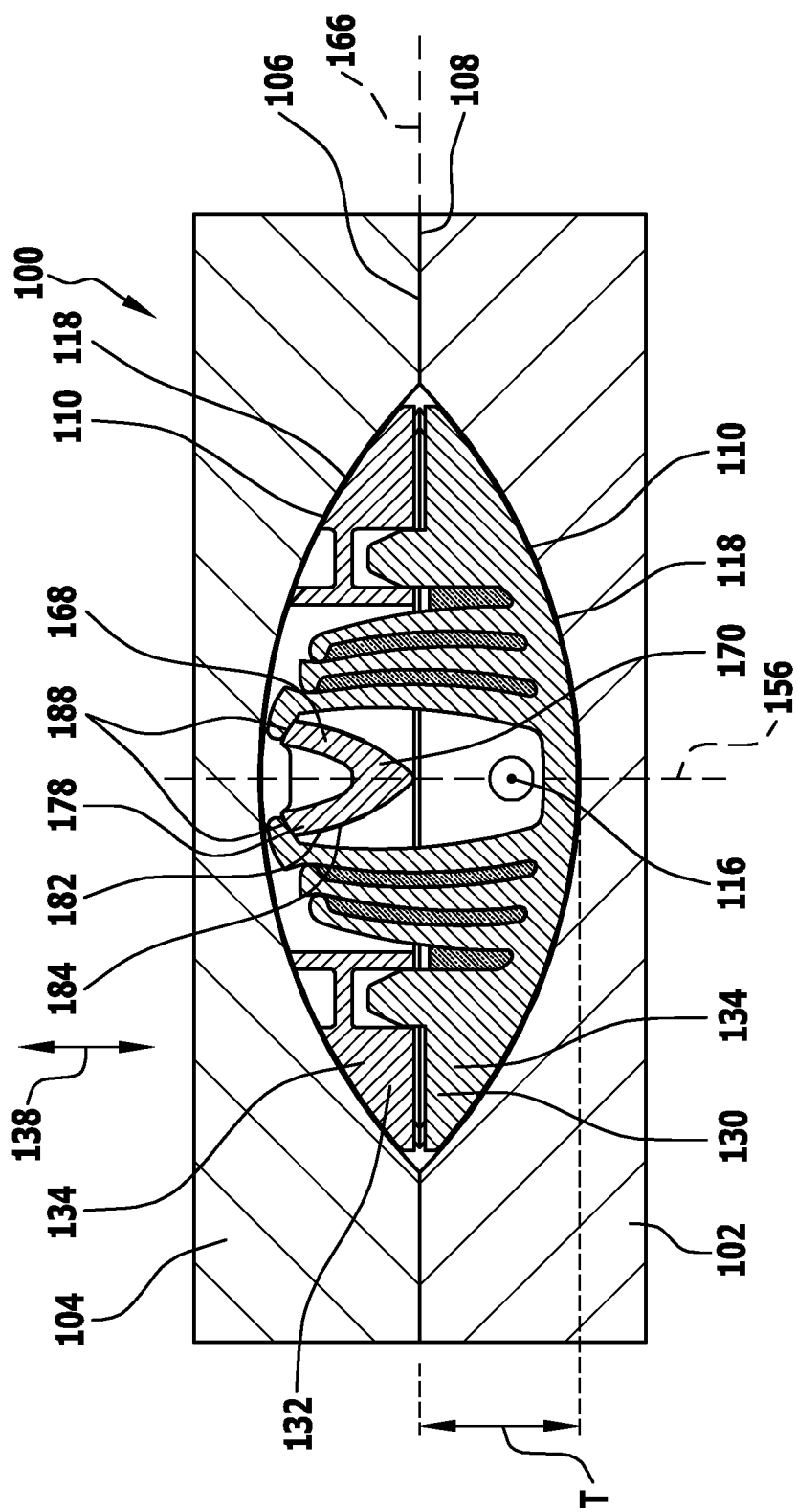
FIG. 7 shows a schematic sectional depiction, corresponding to FIG. 5, of the components and the connecting device from FIG. 5 in a connected state of the components and the connecting elements of the connecting device.
Figure 9:
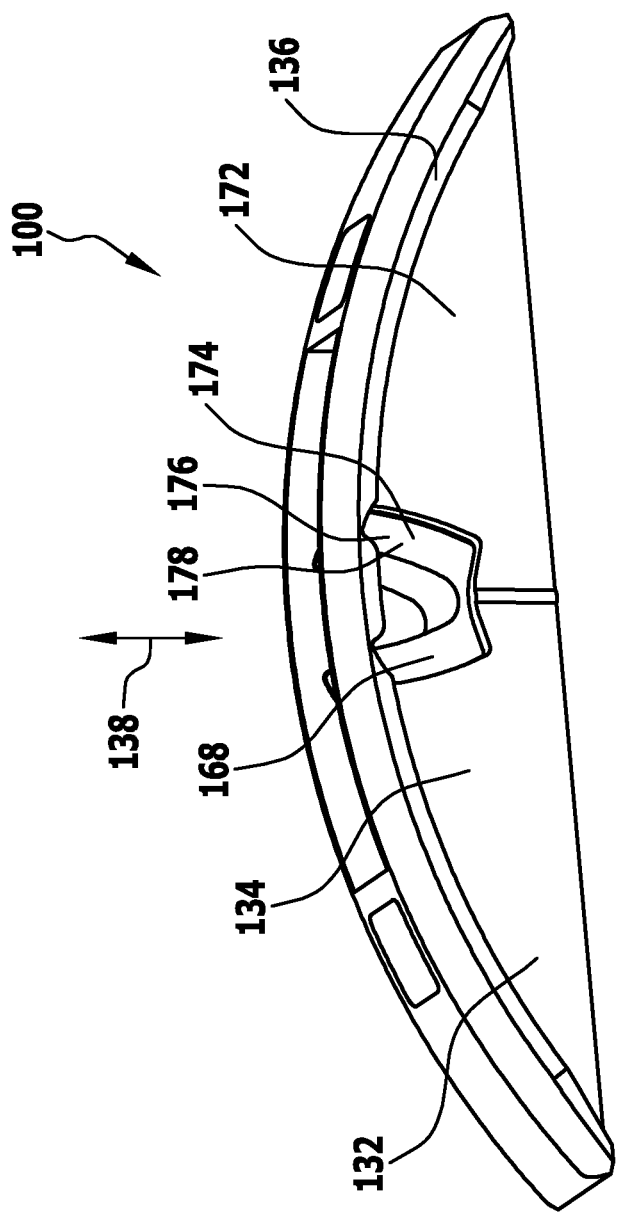
FIG. 9 shows a schematic perspective depiction of the second connecting element of the connecting device from FIG. 5.

The receiving element 168 is arranged, in particular fixed, on the base body 134 at an end 170 of the receiving element 168 remote from a connecting plane 166 (see in particular FIGS. 5, 7, and 9).

The receiving element 168 is arranged between two side walls 172 of the base body 134 of the second connecting element 132.

Cutouts 174, in particular openings 176, may be provided in the side walls 172 in such a way that the receiving element 168 extending between the side walls 172 extends partially along these cutouts 174 and thus in this region is not connected to the side wall 172 and thus not connected to the base body 134. Alternatively hereto, these cutouts 174 may also be expendable, such that continuous side walls 172 are provided.

The receiving element 168 preferably comprises two receiving projections 178.

The receiving projections 178 of the receiving element 168 are in particular of bendable or rigid configuration.

The receiving element 168 is in particular arranged in the middle in the second connecting element 132 and is formed mirror-symmetrical in relation to the transverse center plane 156 of the second connecting element 132. In particular, the receiving projections 178 of the receiving element 168 are formed mirror-symmetrical to each other and are arranged mirror-symmetrical to each other in relation to the transverse center plane 156.

An outer surface 182 of the receiving element 168 preferably has at least approximately a parabolic shape, wherein an x-axis runs in the connecting plane 166 and a y-axis in the transverse center plane 156 (see in particular FIG. 7).

The main spring elements 148, in particular the engagement sections 154 of the main spring elements 148, are moved along said surface 182 of the receiving element 168 when connecting the connecting elements 130, 132 to each other. Due to the parabolic shape of the surface 182, first a large and then a smaller increase in force hereby occurs upon the deflection of the main spring elements 148.

The spring elements 140, in particular the main spring elements 148, are tensioned upon the movement along the surface 182 of the receiving element 168, such that the surface 182 of the receiving element 168 form a tensioning section 184 of the receiving element 168.

As may be gathered in particular from FIG. 7, the engagement sections 154 of the main spring elements 148 and the receiving element 168 in the connected state abut against each other in each case with inclined faces 188, for example.

By means of said inclined faces 188, on the one hand, in the connected state of the connecting elements 130, 132, a tensile force may be exerted on the connecting elements 130, 132, which pulls the connecting elements 130, 132 toward each other. On the other hand, it may preferably be ensured by means of the inclined faces 188 that the connecting elements 130, 132 are able to be separated from each other without being damaged. In particular, due to the inclined faces 188, the main spring elements 148 of the first connecting element 130 may preferably slide counter to the connecting direction 138 along the inclined faces 188 of the receiving element 168 and, as a result, the engagement sections 154 of the main spring elements 148 may be brought out of engagement with the receiving projections 178 of the receiving element 168.

In further (not depicted) embodiments of the connecting device 100, e.g., a different number of main spring elements 148 and/or auxiliary spring elements 150 may be provided. Further, in alternative embodiments, provision may be made for the main spring elements 148 to be formed and arranged such that the engagement sections 154 of the main spring elements 148 are arranged facing away from each other and are moveable toward each other for the deflection of the main spring elements 148. The corresponding second connecting element 132 then preferably comprises two receiving elements 168 which are spaced apart from each other and which in the connected state of the connecting elements 130, 132 are arranged on the sides of the main spring elements 148 remote from the transverse center plane 156.

The embodiment of the connecting device 100 depicted in FIGS. 5 to 9 functions as follows:

First, the components 102, 104 are provided with grooves 110 at the positions which are located opposite each other in the assembled state of the components 102, 104. In particular, the grooves 110 are milled into the components 102, 104 with a special tool, which is known from EP 1 990 549 A1, for example.

The connecting elements 130 and 132, respectively, may then be introduced into the grooves 100 by simply sliding in.

Therein that the holding projections 136 of the connecting elements 130, 132 are brought into engagement with the undercut sections 114 of the grooves 110 during this sliding-in operation, the connecting elements 130, 132 are fixed in the components 102, 104 in a form-fitting manner, at least in relation to a movement of the connecting elements 130, 132 in the connecting direction 138.

The first connecting element 130 is hereby fixed in the first component 102.

This may then be relevant in particular if the first component 102 is that component 102, 104 which is to be connected with its narrow side or face side to a main side of a second component 104.

Upon the arrangement of the grooves 110 and thus the connecting elements 130, 132 on the narrow sides and face sides, respectively, of in particular plate-shaped components 102, 104, it typically is not critical if parts of the first connecting element 130, in particular the main spring elements 148 and/or the auxiliary spring elements 150, protrude over a surface of the component 102, 104, in particular a contact surface 106 at which the components 102, 104 abut against each other.

The second connecting element 132 is preferably arranged in a groove 110 arranged in the main face of the second component 104, wherein the second connecting element 132 preferably does not project over the main face, in particular the contact surface 106.

The second component 104 may thus, despite the second connecting element 132 already being installed, be stacked on further, in particular plate-shaped components 102, 104 by means of the main face, without having to fear damaging the components 102, 104 or the second connecting element 132.

For connecting the connecting elements 130, 132 and thus the components 102, 104 to each other, the components 102, 104 together with the connecting elements 130, 132 arranged therein are moved toward each other along the connecting direction 138 which is preferably perpendicular to the connecting plane 166.

Figure 6:
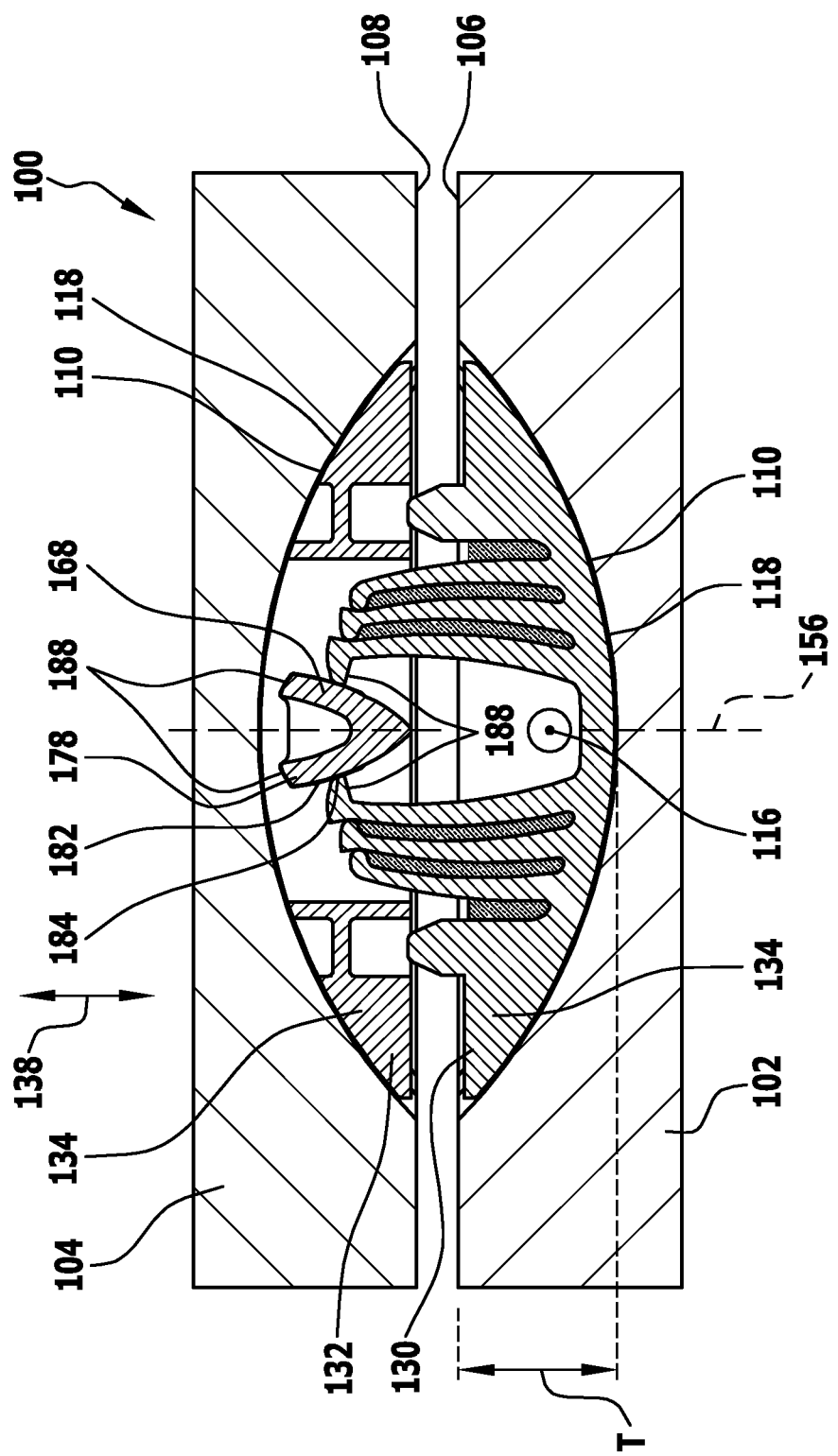
FIG. 6 shows a schematic sectional depiction, corresponding to FIG. 5, of the components and the connecting device from FIG. 5 in an intermediate state between the separated state and a connected state.

As may be gathered in particular from FIGS. 5 to 7, first the main spring elements 148 hereby come into engagement with the receiving element 168, in particular with the tensioning section 184 of the receiving element 168.

The engagement sections 154 of the main spring elements 148 are, upon the movement thereof, moved away from the transverse center plane 156 along the tensioning section 184 of the receiving element 168 in the directions of deflection 146. The main spring elements 148 are hereby deflected and thus tensioned.

The auxiliary spring elements 150 are also deflected as a result of the deflection of the main spring elements 148.

Due to the auxiliary spring elements 150, the force required for deflecting the main spring elements 148 and thus also the spring force of the main spring elements 148 are increased.

Thus, a significantly greater force must be applied in order to connect the connecting elements 130, 132 to each other than if the main spring elements 148 were provided without the auxiliary spring elements 150 serving as reinforcing elements 158.

Due to the parabolic shape of the surface 182 of the receiving element 168, it results in at first a faster and then a slower deflection of the main spring elements 148 when pushing the first connecting element 130 onto the second connecting element 132.

In particular, a high spring tension may hereby be generated in order to tightly connect the connecting elements 130, 132 and thus also the components 102, 104 to each other, wherein at the same time a maximal force required for connecting the connecting elements 130, 132 is reduced.

The connecting of the connecting elements 130, 132 to each other is also optimized in the embodiment depicted in FIGS. 5 to 9 in that the receiving projections 178 of the receiving element 168 are configured to be resilient, in particular bendable. The engagement sections 154 of the main spring elements 148 may hereby be more easily moved past the receiving projections 178 of the receiving element 168.

An embodiment of a connecting device 100 depicted in FIGS. 10 to 13 differs from the embodiment depicted in FIGS. 5 to 9 substantially in that the connecting device 100 comprises a different arrangement of spring elements 140.

The connecting device 100 hereby comprises a spring device 200 which comprises two spring units 202. Each spring unit 202 is formed by a spring element 140 and an abutment element 204.

A spring force of the spring element 140 may also be optimized by means of an abutment element 204.

In the embodiment of the connecting device 100 depicted in FIGS. 10 to 13, in particular no auxiliary spring elements are provided.

The abutment elements 204 are in particular of rigid and non-resilient configuration.

As may be gathered in particular from FIGS. 10 to 13, the spring device 200 may be provided in particular on the first connecting element 130 of the connecting device 100.

In particular, said spring device 200 may be brought into engagement with the receiving element 168 of the second connecting element 132 in accordance with the embodiment of the connecting device 100 depicted in FIGS. 5 to 9, in order to connect two objects, in particular components 102, 104, to each other.

In the embodiment of the connecting device 100 depicted in FIGS. 10 to 13, provision may be made in particular for the first connecting element 130 to comprise a one-piece base body 134 which is configured as a plastic injection molded product 206.

The base body 134 thus comprises in particular the two abutment elements 204 and the two spring elements 140.

Figure 10:
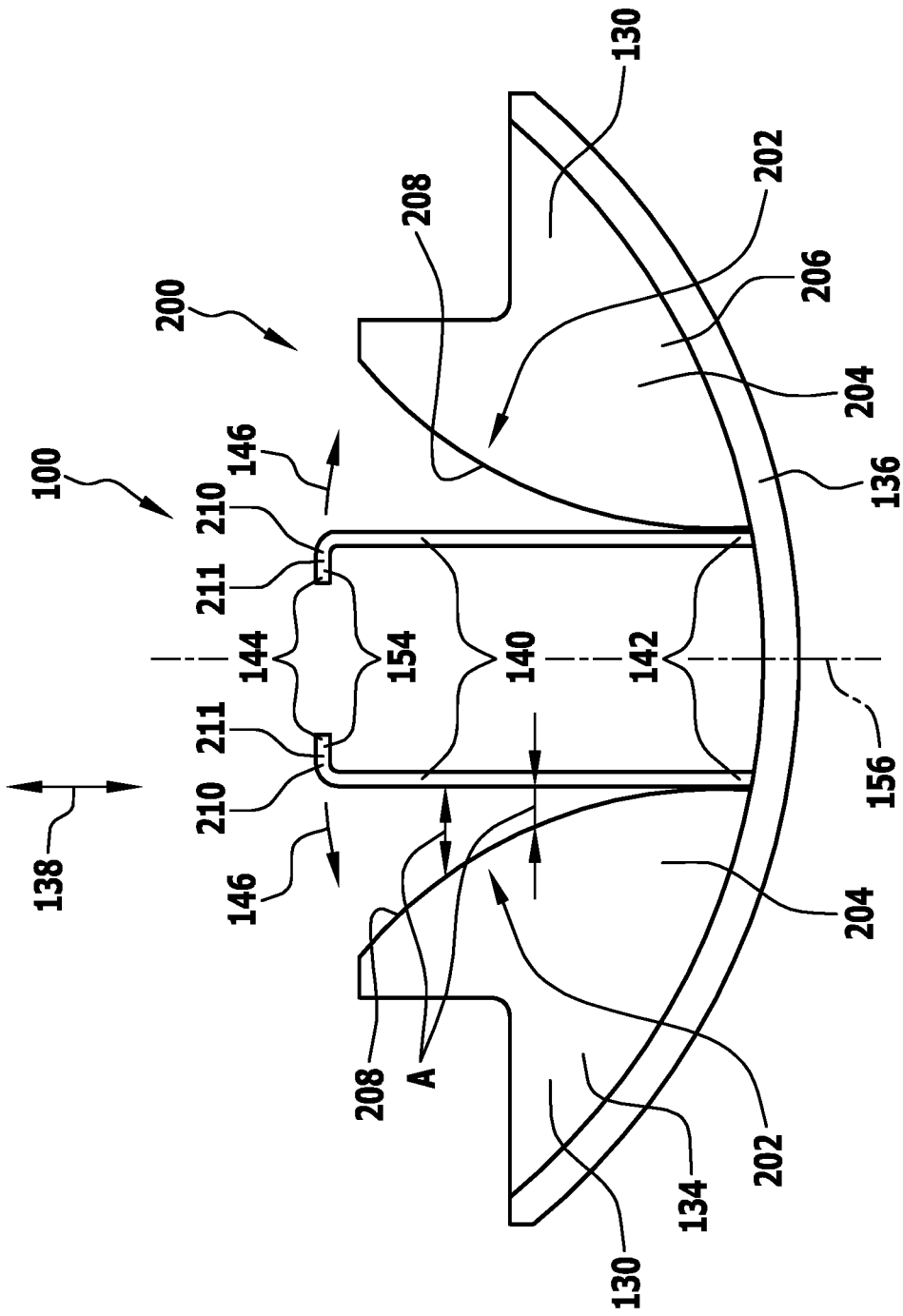
FIG. 10 shows a schematic side view of a preferred embodiment of a connecting device in which two spring elements which are able to abut against two abutment elements are provided, wherein the spring elements are in an initial state.

In the initial state of the spring elements 140 depicted in FIG. 10, the latter are arranged and/or formed relative to the abutment element 204 in such a way that a distance A from the respective corresponding abutment 204 over-proportionately increases in the direction of the respective second end 144, commencing from the first end 142 of each one spring element 140.

On the side of each one abutment element 204 facing the respective spring element 140, an abutment surface 208 is hereby formed which, upon deflecting the respective spring element 140, comes into direct contact with the same.

The abutment surface 208 is hereby in particular configured to be curved in the shape of a circular segment.

In the initial state, the spring elements 140 are preferably configured to be substantially straight and/or non-curved.

Only one end region of each one spring element 140 in the region of the second end 144 may be, e.g., be kinked or beveled or otherwise bent. As a result, it may in particular be made possible for the spring elements 140 to each have an engagement section 154 for connecting to the further connecting element 132.

The engagement sections 154 are hereby in particular latching elements 210 or hook elements 211.

As is made clear by a comparison of FIGS. 10 to 13, the spring elements 140 may be deflected outwardly away from the transverse center plane 156.

The spring elements 140 are hereby moved in particular in the direction of the abutment elements 204.

In principle, upon the deflection of spring element 140, a load occurs which is locally very different and which leads to degrees of deformation which are locally very different.

Without the use of an abutment element 204, this would, in the case of the spring elements 140 in accordance with the embodiment of a connecting device 100 depicted in FIGS. 10 to 13, lead in particular to the spring elements 140 being particularly strongly loaded and correspondingly deformed in the region of the respective first end 142.

It would result in practically no deformation in particular in the region of the second end 144.

Such a deformation behavior leads in particular to only a small spring force being able to be applied before a local plastic deformation or other damaging of the spring element 140 occurs.

By using abutment elements 204, however, an optimized elastic deformation of each one spring element 140 may be achieved in order to ultimately enable particularly high spring forces.

For this purpose, the spring elements 140 are unwound on the abutment elements 204 and hereby substantially adopt the shape of the abutment surface 208 of the respective abutment element 204.

The spring elements 140 are thus bent in particular substantially circular segment-shaped.

Figure 11:
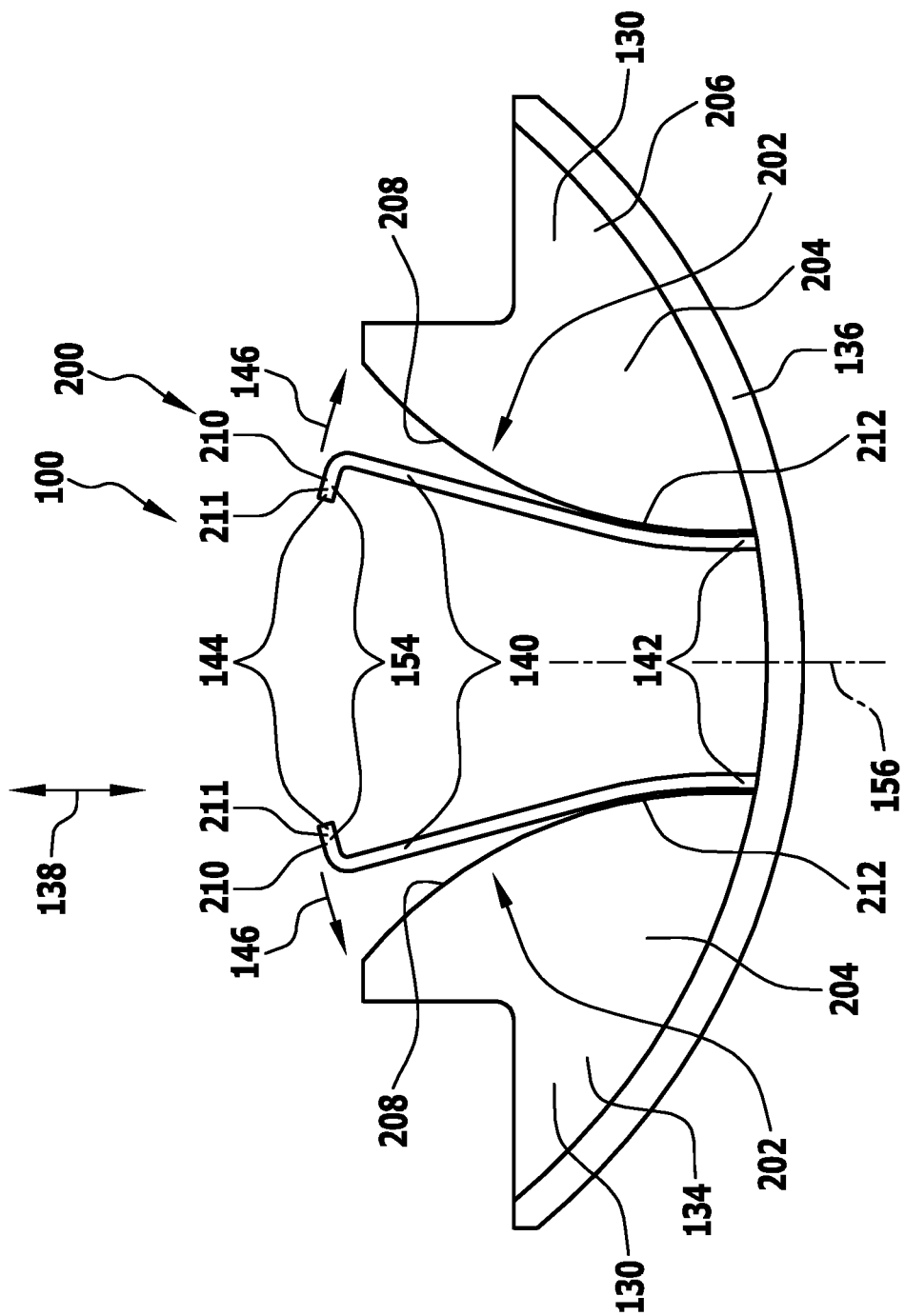
FIG. 11 shows a schematic depiction, corresponding to FIG. 10, of the connecting device from FIG. 10, wherein the spring elements have been slightly deflected.
Figure 12:
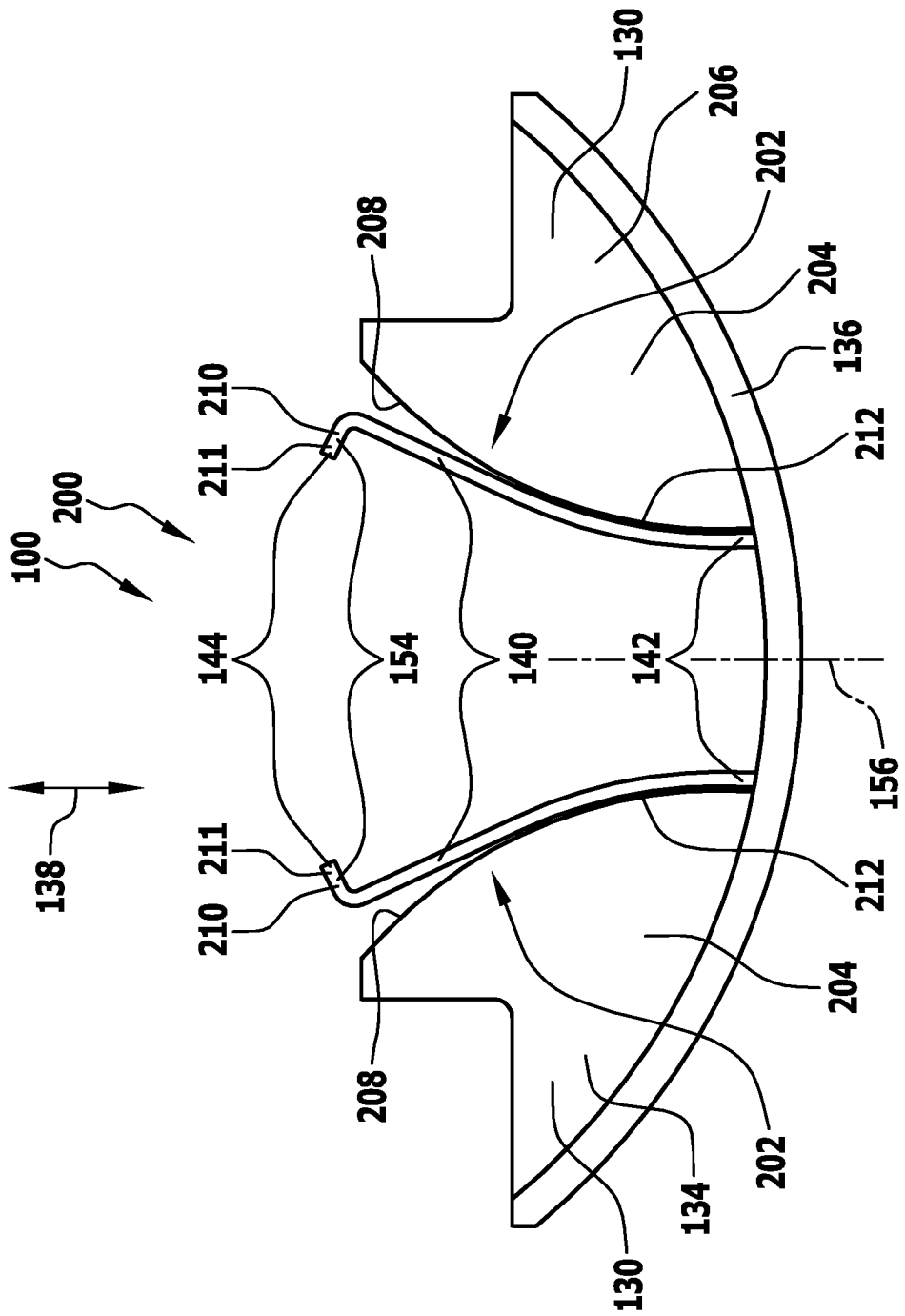
FIG. 12 shows a schematic depiction, corresponding to FIG. 10, of the connecting device from FIG. 10, wherein the spring elements have been deflected slightly further than in FIG. 11.
Figure 13:
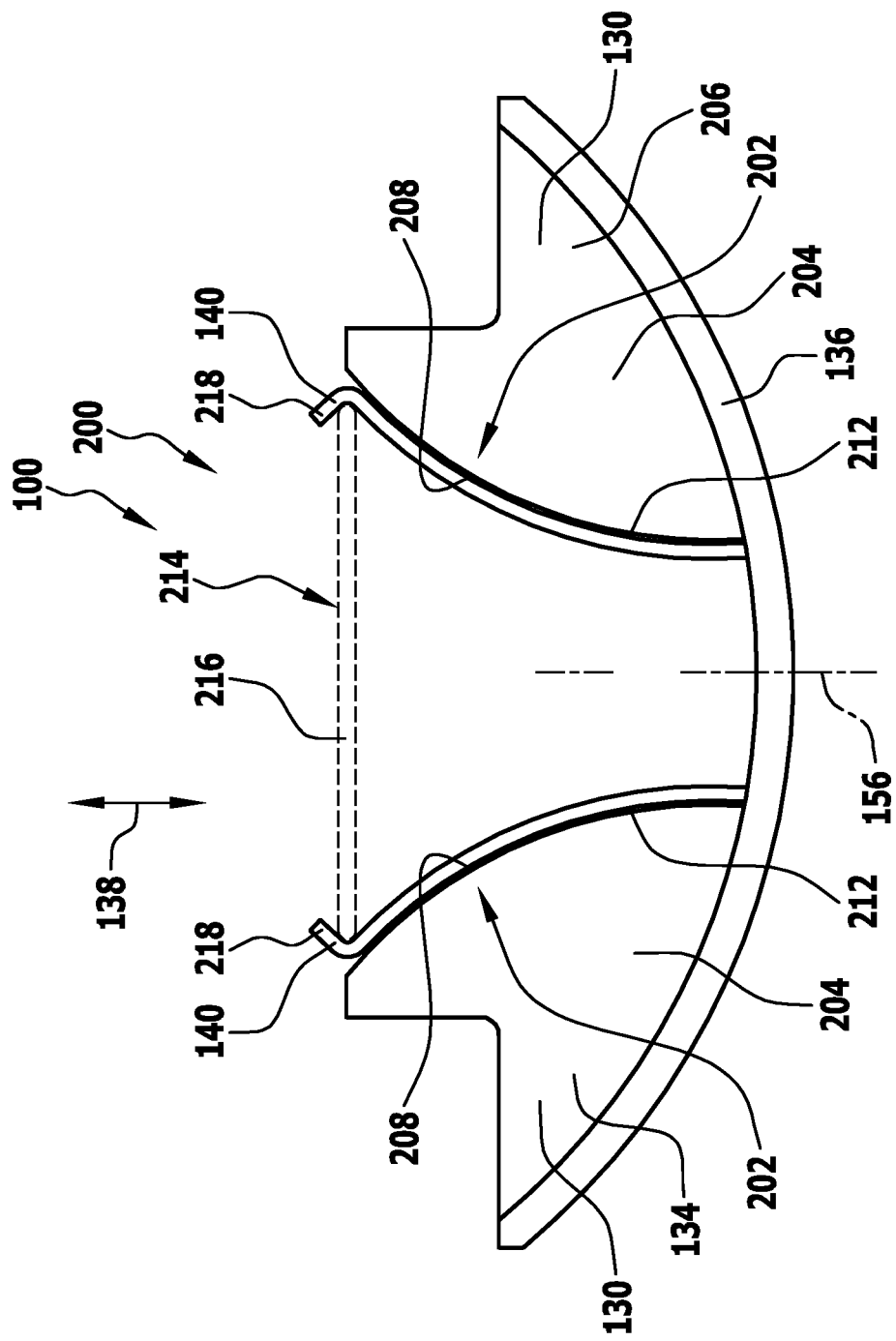
FIG. 13 shows a schematic depiction, corresponding to FIG. 10, of the connecting device from FIG. 10, wherein the spring elements are arranged in a maximally deflected position.
Figure 14:
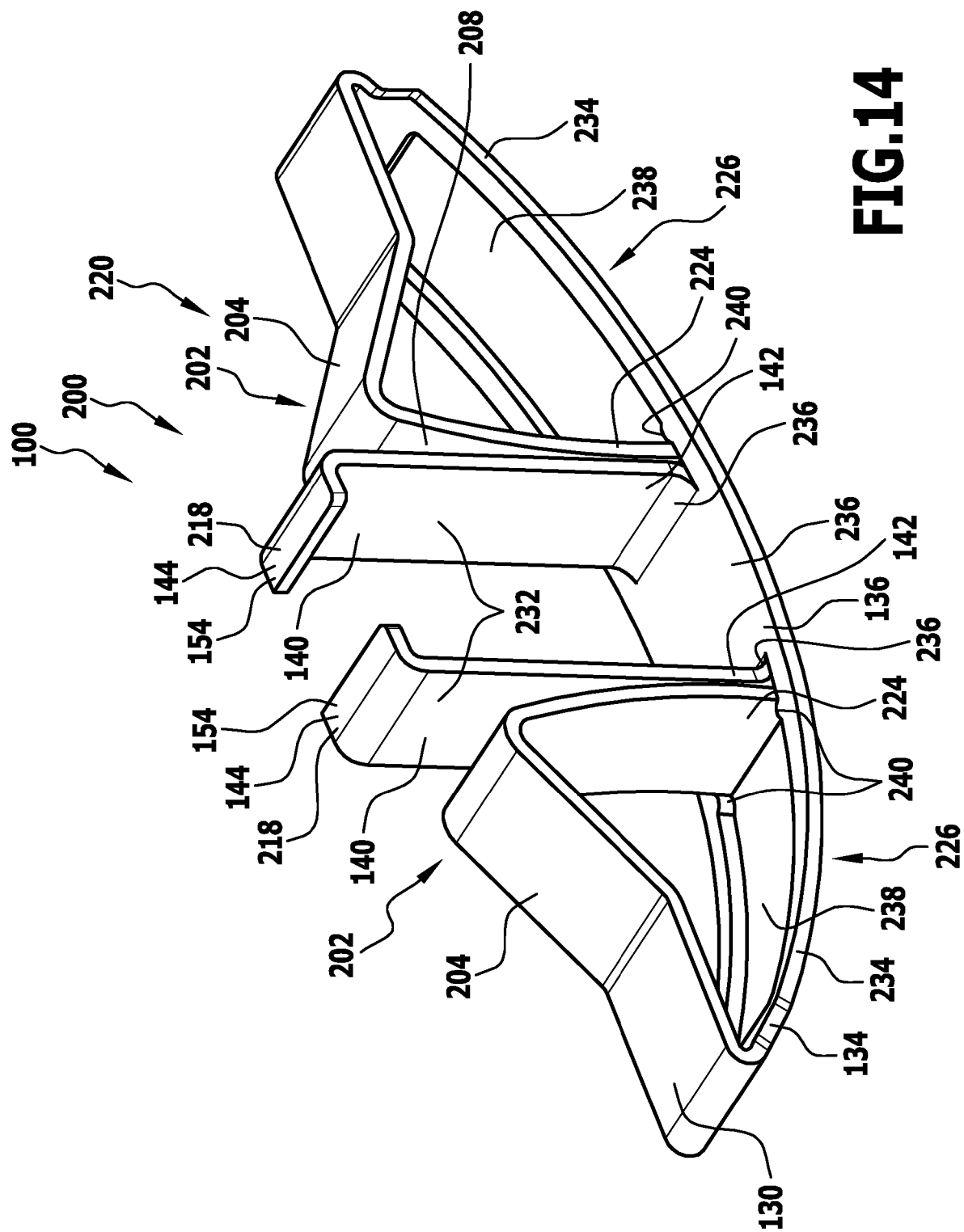
FIG. 14 shows a further alternative embodiment of a connecting device in which a connecting element configured as a sheet metal shaped product is provided.
Figure 15:
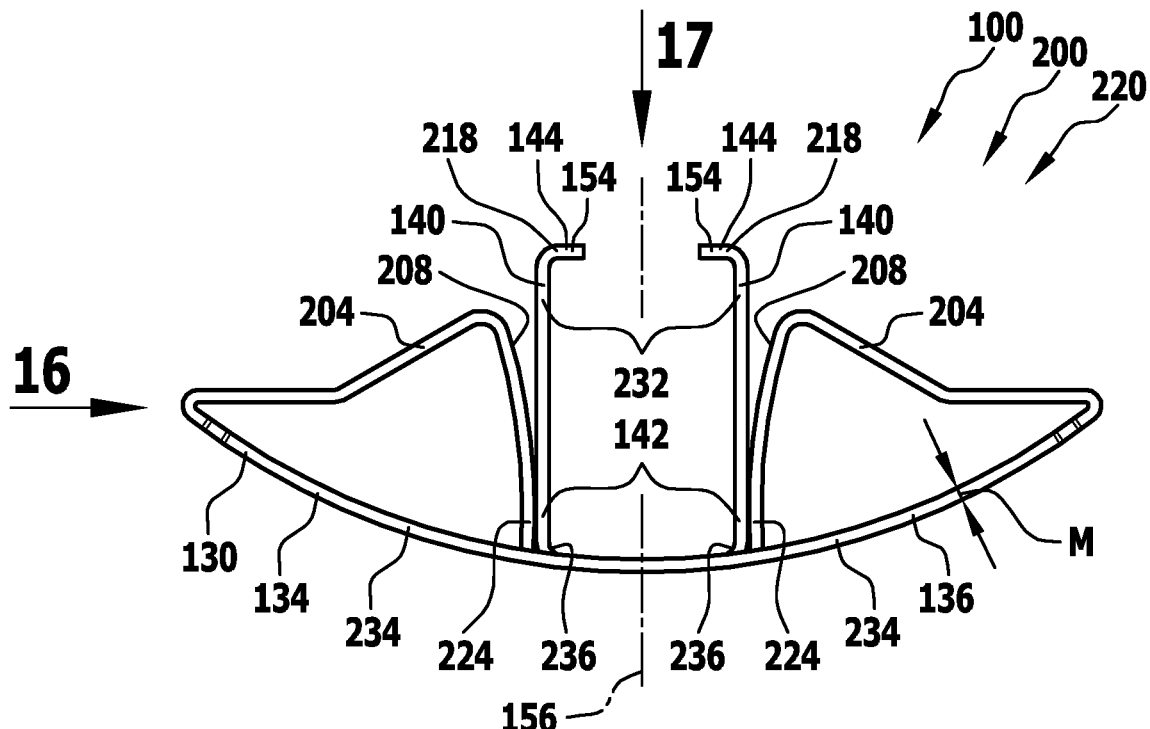
FIG. 15 shows a schematic side view of the connecting device from FIG. 14.
Figure 16:
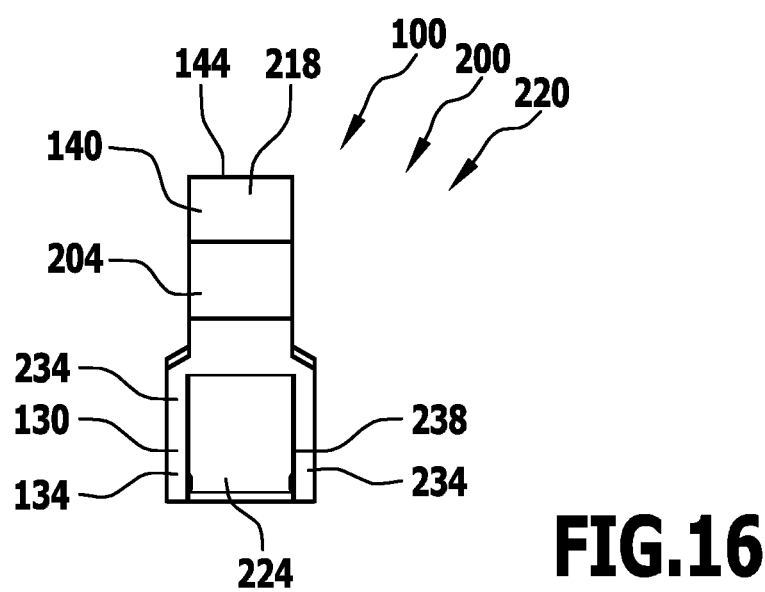
FIG. 16 shows a further schematic side view of the connecting element from FIG. 15 with viewing direction in the direction of arrow 16 in FIG. 15.

As may be gathered in particular from FIGS. 11 to 13, this hereby results in a contact surface 212 which is that face at which the spring element 140 and the abutment element 204 contact each other.

This contact surface 212 enlarges with increasing deflection of the spring element 140 and thereby expands in particular from the first end 142 of the spring element 140 along the abutment surface 208 of the abutment element 204 in the direction of the second end 144 of the spring element 140.

The contact surface 212 is hereby preferably configured to be uninterrupted and continuous, such that there is in particular a uniform abutment of the spring element 140 in area contact against the abutment element 204. This ultimately enables a uniform deformation of the spring element 140 in order to uniformly, elastically deform the spring element 140, as possible, across its entire length, almost up to the plastic deformation limit. The restoring forces resulting therefrom then bring about the desired high spring forces of each one spring element 140.

As may be gathered from FIG. 13, provision may be made for the connecting device 100 to comprise a storage device 214 for storing a holding force, in particular a spring force.

The storage device 214 comprises in particular an arresting element 216 by means of which spring elements 140 serving as holding elements 218 are arrestable in a deflected state.

A biasing of the spring elements 140 of the connecting element 130 may thus be achieved by means of the storage device 214, in particular the arresting element 216, whereby the force necessary for connecting the two connecting elements 130, 132 may be minimized, in particular during the assembly of the components 102, 104.

In particular, provision may be made for the arresting element 216 to be actuated, preferably removed or destroyed, by means of the further connecting element 132 in order to release the spring elements 140.

The spring elements 140 then relax in particular in such a way that they engage around the receiving element 168 of the further connecting element 132 and thus produce the connection between the two connecting elements 132.

In all other respects, the embodiment of the connecting device 100 depicted in FIGS. 10 to 13 corresponds with respect to structure and function with the embodiment depicted in FIGS. 5 to 9, such that reference is made to its description in that regard.

A further embodiment of a connecting device 100 depicted in FIGS. 14 to 18 differs from the embodiment depicted in FIGS. 10 to 13 substantially in that the base body 134 of the first connecting element 130 is configured as a sheet metal shaped product 220.

The connecting element 130 in accordance with the embodiment depicted in FIGS. 14 to 18 is producible in particular from a sheet metal strip 222 (see FIG. 18).

The sheet material strip 222 hereby has, e.g., a material thickness M (thickness) of about 0.8 mm.

The sheet metal strip 222 is formed substantially mirror-symmetrical in relation to a transverse center plane 156.

At the opposing ends 224 of the sheet metal strip 222, the sheet metal strip 222 preferably has a width $B_E$ which is smaller than a width $B_Z$ in a central section 226 of the sheet metal strip 222 arranged between the two end 224.

The central section 226 comprises in particular one or more U-shaped material recesses 228, in particular punchings 230.

By means of said U-shaped material recesses 228, in particular in each case one middle section 232 and one web section 234 surrounding the middle section 232 are formed.

The middle sections 232 may in particular be bent out of the plane of the sheet metal strip 222.

The middle sections 232 then in particular form the spring elements 140.

In a transition section 236, the middle sections 232 remain connected to the web sections 234.

The transition sections 236 are then in particular the first ends 142 of each one spring element 140.

The second ends 144 of the spring elements 140 are, e.g., beveled or otherwise bent in order to ultimately form the engagement sections 154.

The web sections 234 are bent in particular circular segment-shaped and then form the projections 136 which are circular segment-shaped in a longitudinal section.

By means of these projections 136, which are formed by the web sections 234, the connecting element 130 is thus in particular fixable in a form-fitting manner in a groove 110 in a component 102, 104.

The abutment elements 204 are formed by shaping the ends 224 of the sheet metal strip 222.

For this purpose, the ends 224 are bent back to the central section 226 of the sheet metal strip 222, wherein in particular a curved section of each one end 224 is formed, which forms the abutment surface 208 of each one abutment element 204.

The ends 224 are in particular plugged or clamped in openings 238 of the sheet metal strip 222. Said openings 238 result from bending the middle sections 232 out from the central section 226.

For example, by means of projections 240, which are formed in the region of the web sections 234 and project into the openings 238, a reliable fixing of the respective end 224 in a clamping manner may be ensured.

By producing the connecting element 130, in particular spring elements 140 of the connecting element 130, from a metallic material, in particular from sheet metal, it may preferably be ensured that the spring elements 140 obtain their spring force over a long period of time and thus a reliable connection between two connecting elements 130, 132 persists.

Simultaneously with low material and cost expenditure, very high spring force may hereby be achieved through the combination of spring element 140 and abutment element 204.

In all other respects, the embodiment of the connecting device 100 depicted in FIGS. 14 to 18 corresponds with respect to structure and function with the embodiment depicted in FIGS. 10 to 13, such that reference is made to its preceding description in that regard.

In further (not depicted) embodiments of the connecting device 100, individual or multiple features and/or advantages of the connecting devices described above may be combined with each other in any way.

REFERENCE NUMERAL LIST 100 connecting device
102 component
104 component
106 contact surface
108 contact surface
110 groove
112 base section
114 undercut section
116 thickness direction
118 groove base surface
120 base surface
122 undercut surface
124 delimiting surface
126 delimiting wall
130 connecting element
132 connecting element
134 base body
136 holding projection
138 connecting direction
140 spring element
142 end
144 end 146 direction of deflection
148 main spring element
150 auxiliary spring element
152 abutment section
154 engagement section
156 transverse center plane
158 reinforcing element
166 connecting plane
168 receiving element
170 end
172 side wall
174 cutout
176 opening
178 receiving projection
182 surface
184 tensioning section
188 inclined face
200 spring device
202 spring unit
204 abutment element
206 plastic injection molded product
208 abutment surface
210 latching element
211 hook element
212 contact surface
214 storage device
216 arresting element
218 holding element
220 sheet metal shaped product
222 sheet metal strip
224 end
226 central section
228 material recess
230 punching
232 middle section
234 web section
236 transition section
238 opening
240 projection
A distance
B groove width
b width
h height
M material thickness

The invention claimed is:

1. A connecting device for connecting two objects, in particular for connecting two furniture or machine parts, said connecting device comprising:
at least one spring device having:
a spring element which is able to be brought from an initial state into a deflected state by elastic deformation; and
an abutment element against which the spring element is able to abut for reaching a deflected state of the spring element, wherein at least one end of the spring element is moveable relative to the abutment element by elastic deformation of the spring element,
the spring element in the initial state thereof has an increasing distance from the abutment element in the direction of the end of the spring element which is moveable relative to the abutment element,
the spring element has a surface extending outward from the spring device,
at least a majority of the surface of the spring element that extends outward from the spring device abuts the abutment element when in the deflected state,
the connecting device comprises one or more connecting elements which in a connecting state and/or anchoring state are arranged on at least one of the objects,
at least one connecting element comprises one or more holding projections which each have a curved supporting face which is circular arc-shaped in a longitudinal section,
the one or more holding projections are insertible into a groove, provided on one of the objects, with a curved undercut surface which is circular arc-shaped in a longitudinal section,
the groove comprises a base section and one or more undercut sections extending in a thickness direction away from the base section, and
the one or more holding projections in the connecting state and/or anchoring state engage into the one or more undercut sections of the groove.

2. The connecting device in accordance with claim 1, wherein the spring element in the initial state thereof has a non-linearly increasing distance from the abutment element in the direction of the end of the spring element which is moveable relative to the abutment element.

3. The connecting device in accordance with claim 1, wherein the abutment element comprises an abutment surface for abutting the spring element, wherein the abutment surface is configured to be curved, in particular curved at least in the shape of a circular segment.

4. The connecting device in accordance with claim 1, wherein the spring element and the abutment element are formed as one piece with each other.

5. The connecting device in accordance with claim 1, wherein the spring device is or comprises a plastic injection molded product and/or a sheet metal shaped product.

6. The connecting device in accordance with claim 1, wherein the spring element with increasing deflection from the initial state is able to abut or abuts directly against the abutment element in an enlarging contact surface.

7. The connecting device in accordance with claim 1, wherein a local elastic deformation of the spring element in the deflected state is at least approximately identical at all positions along a contact surface in which the spring element and the abutment element contact each other.

8. The connecting device in accordance with claim 1, wherein the end of the spring element which is moveable relative to the abutment element has a latching element and/or a hook element.

9. The connecting device in accordance with claim 1, wherein the connecting device comprises a connecting element which has a one-piece base body which comprises the at least one spring device.

10. The connecting device in accordance with claim 1, wherein the connecting device comprises one or more connecting elements for arranging on and/or in a first object and/or one or more connecting elements for arranging on and/or in a second object, wherein for connecting the objects to each other, at least one connecting element on and/or in the first object is able to be brought into engagement with the second object, in particular with at least one connecting element on and/or in the second object.

11. The connecting device in accordance with claim 1, wherein the connecting device comprises at least one connecting element which comprises a holding element for producing a connection between the two objects and a storage device for storing a holding energy of the holding element.

12. The connecting device in accordance with claim 11, wherein holding energy is suppliable to the storage device before producing the connection between the two objects, and wherein the supplied holding energy is storable by means of the storage device until producing the connection.

13. The connecting device in accordance with claim 11, wherein the storage device upon producing the connection between the two objects and/or for producing the connection between the two objects is actuateable such that the holding element is able to be brought into a holding position using the holding energy.

14. The spring device in accordance with claim 1, wherein
the abutment element is a rigid and non-resilient element, and
the spring device does not include auxiliary spring elements.

15. A method for connecting two objects, in particular furniture or machine parts, comprising the following:
providing a connecting device, wherein the connecting device has at least one spring device, and wherein said at least one spring device having a spring element which is able to be brought from an initial state into a deflected state by elastic deformation, and an abutment element against which the spring element is able to abut for reaching a deflected state of the spring element, wherein at least one end of the spring element is moveable relative to the abutment element by elastic deformation of the spring element, the spring element in the initial state thereof has an increasing distance from the abutment element in the direction of the end of the spring element which is moveable relative to the abutment element;
arranging a connecting element on one of the objects or introducing a connecting element into one of the objects; and
connecting the connecting element to the further object, in particular to a further connecting element arranged on and/or in the further object, wherein
the spring element has a surface extending outward from the spring device, and
at least a majority of the surface of the spring element that extends outward from the spring device abuts the abutment element when in the deflected state.

16. The method in accordance with claim 15, wherein
the abutment element is a rigid and non-resilient element, and
the spring device does not include auxiliary spring elements.

* * * * *